Figure 1:
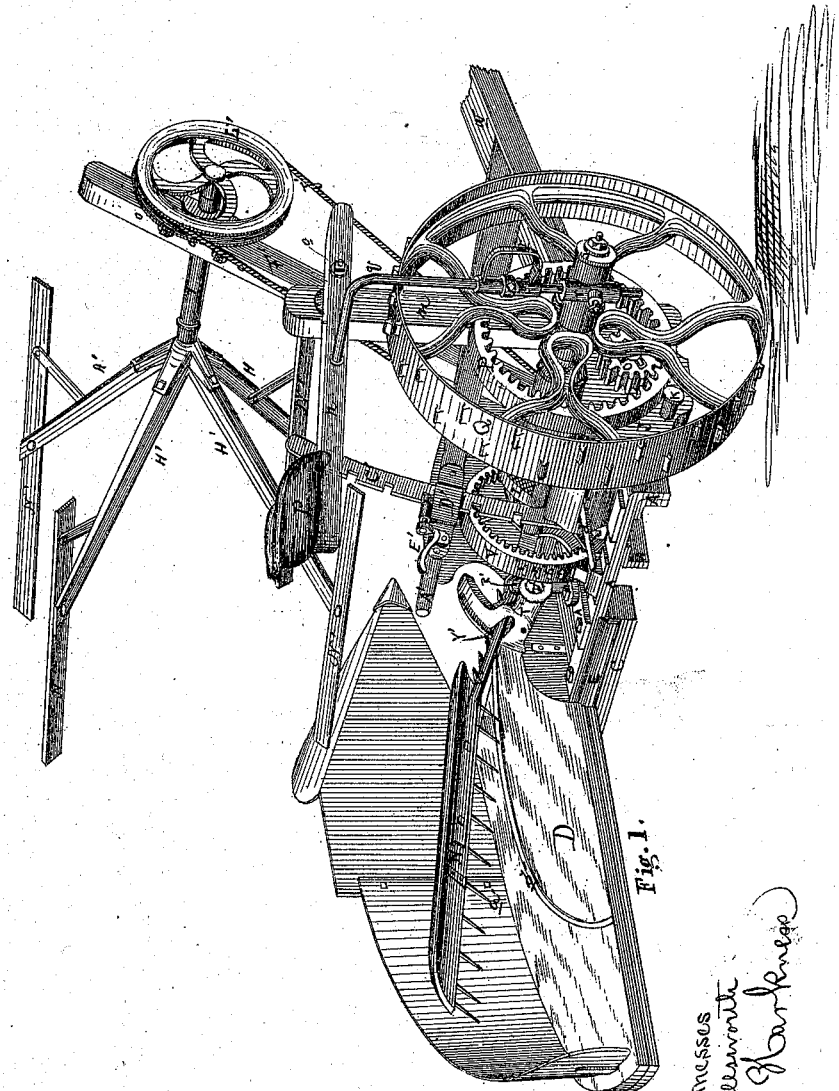

6 Sheets—Sheet 1.

S. T. LAMB & W. N. WHITELEY.
HARVESTER.

No. 105,343.   Patented July 12, 1870.

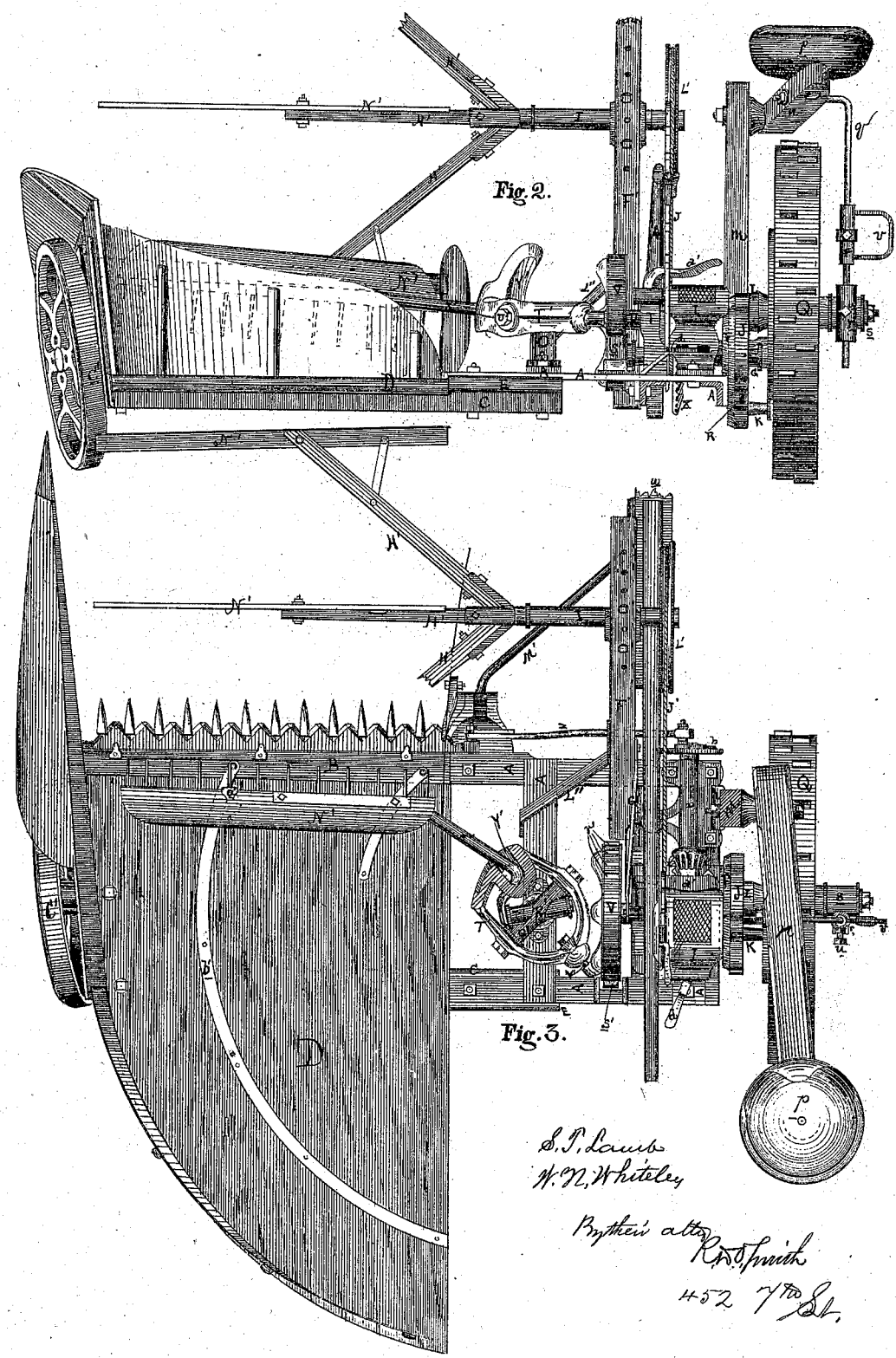

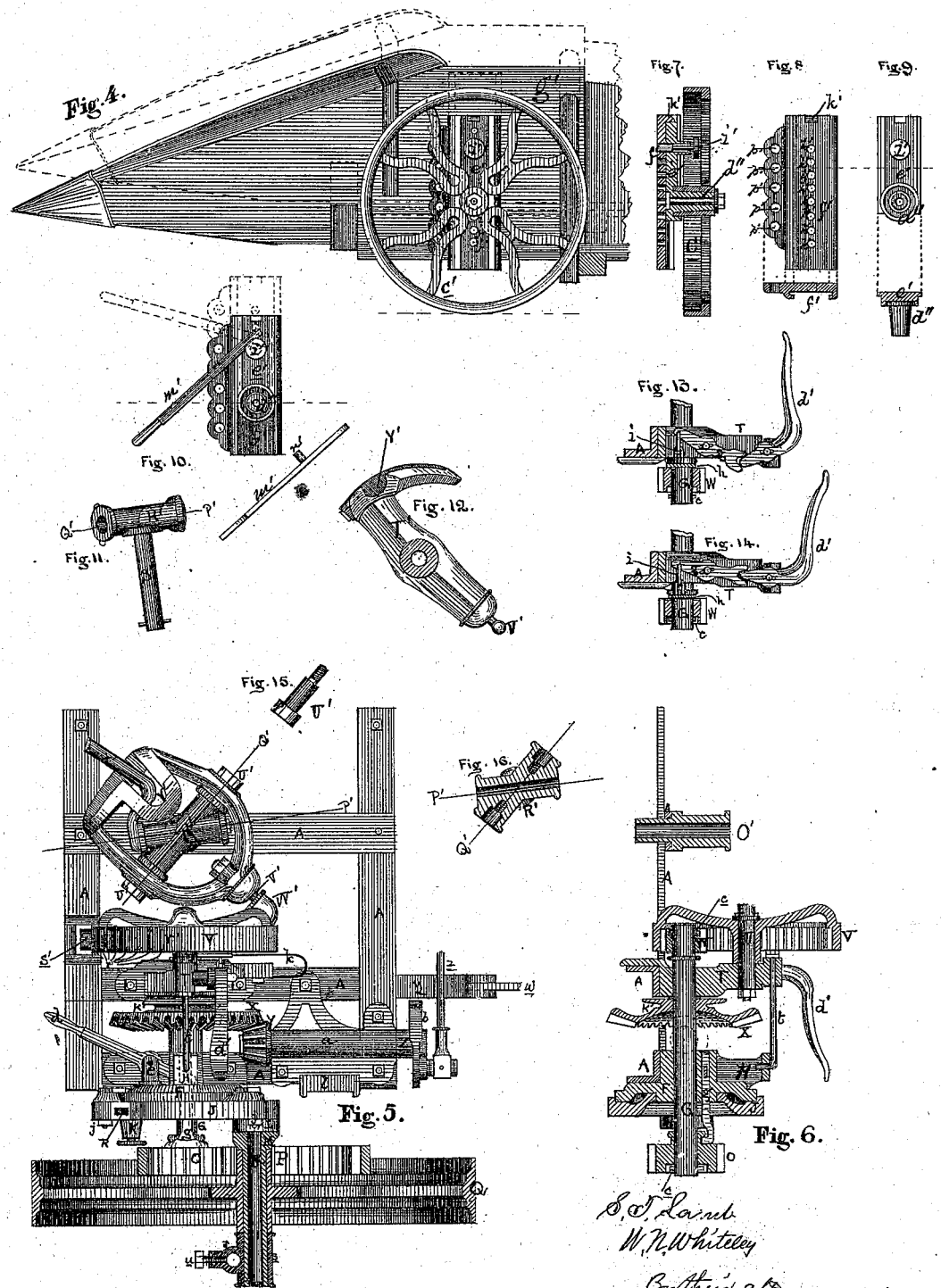

6 Sheets—Sheet 4.
S. T. LAMB & W. N. WHITELEY.
HARVESTER.
No. 105,343.  Patented July 12, 1870.
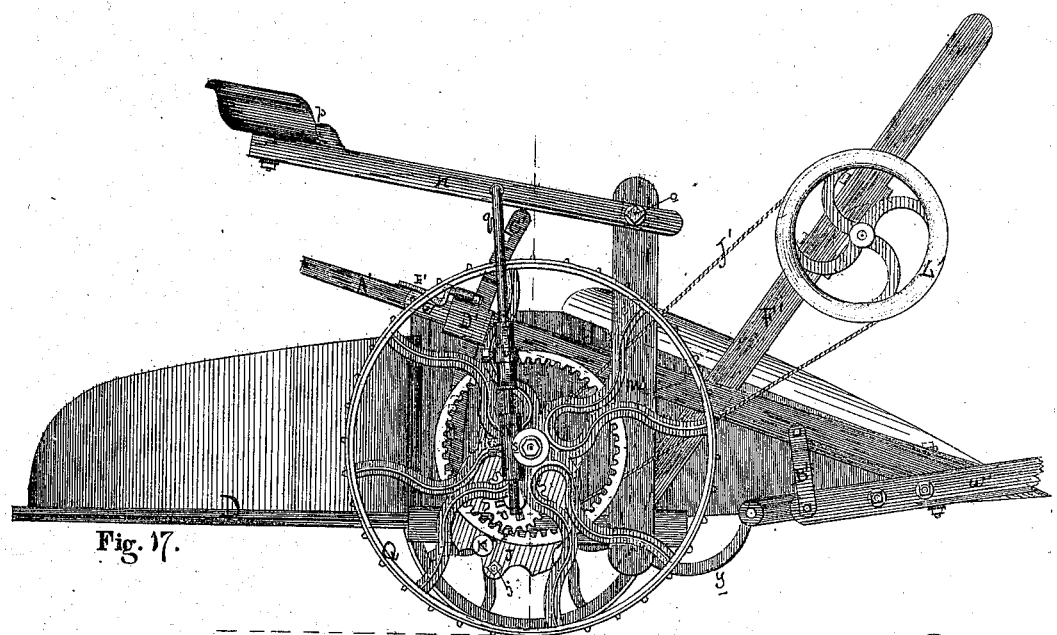
Fig. 17.
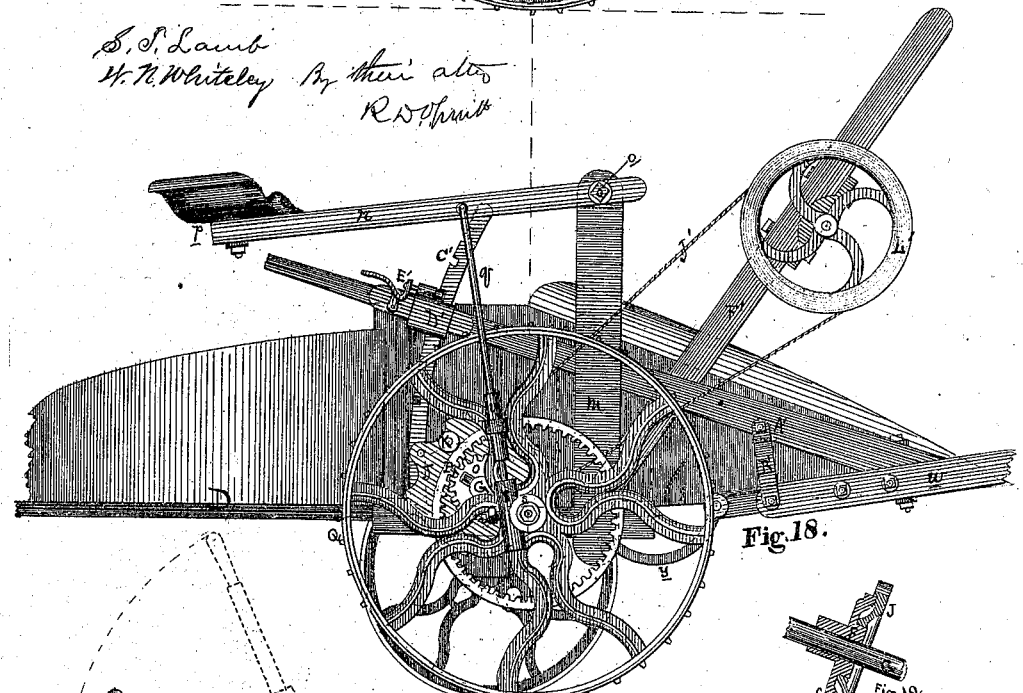
Fig. 18.
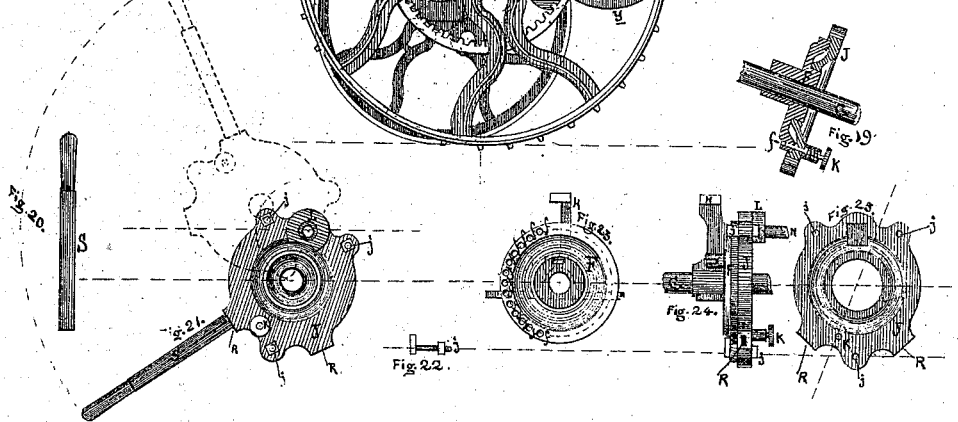

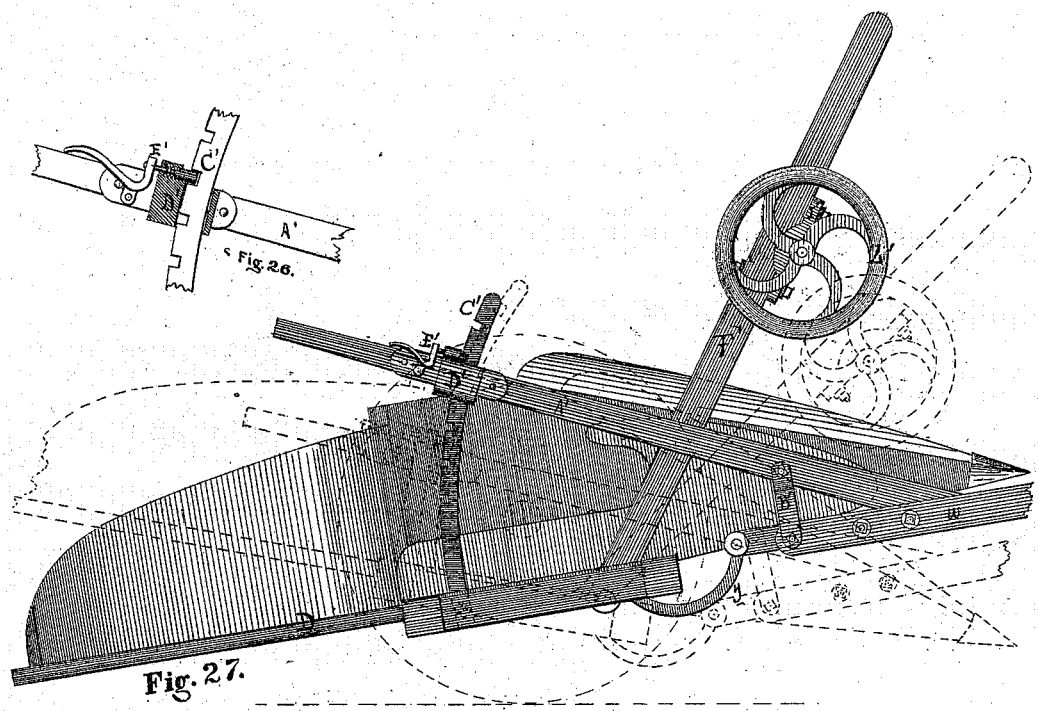
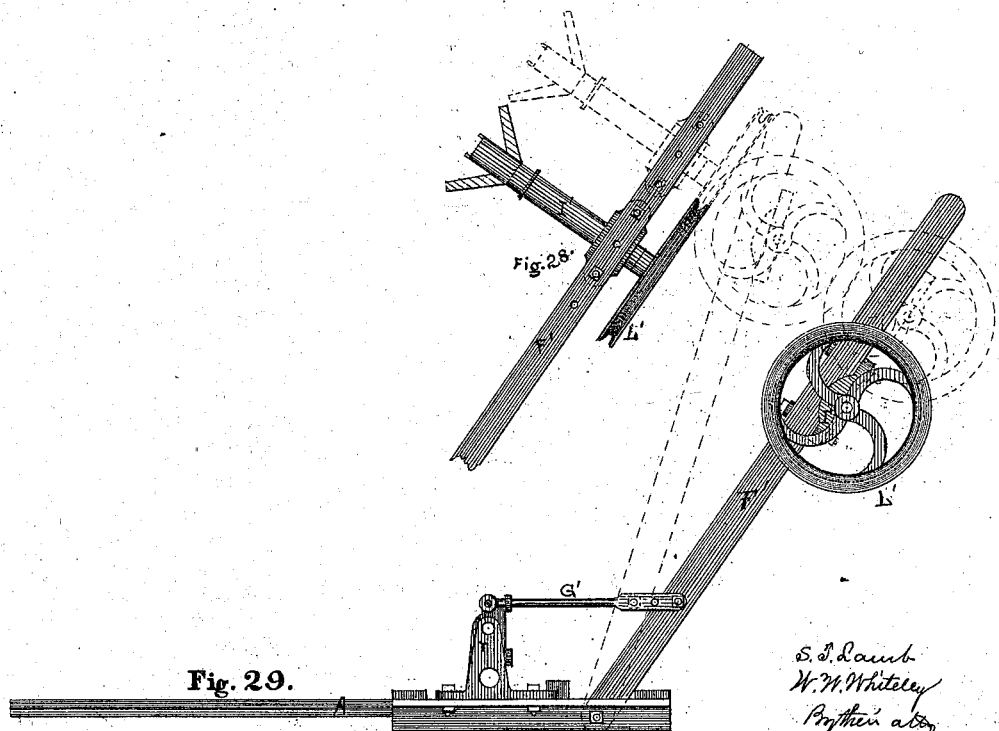

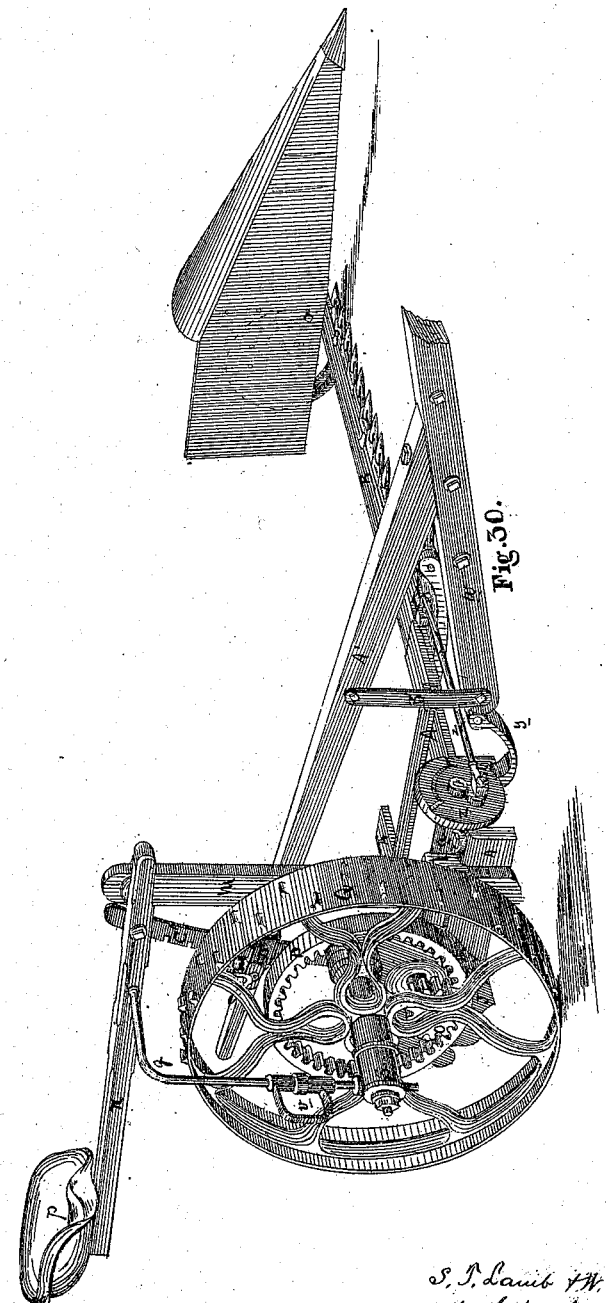

United States Patent Office.

SALEM T. LAMB AND WILLIAM N. WHITELEY, OF SPRINGFIELD, OHIO.

Letters Patent No. 105,343, dated July 12, 1870.

IMPROVEMENT IN HARVESTERS.

The Schedule referred to in these Letters Patent and making part of the same.

*To all whom it may concern:*

Be it known that we, SALEM T. LAMB and WILLIAM N. WHITELEY, of Springfield, in the county of Clark and State of Ohio, have invented a new and useful Improvement in Harvesters; and we do hereby declare the following to be a full, clear, and exact description of the same, reference being had to the accompanying drawing, in which—

Figure 1 is a perspective view of our machine.
Figure 2 is a rear elevation of the same.
Figure 3 is a plan of the same.
Figure 4 is an elevation of grain-wheel side of same.
Figure 5 is a plan of gearing.
Figure 6 is a sectional plan of the same.
Figure 7 is a vertical section of grain-wheel, &c.
Figures 8, 9, 10, mountings of grain-wheel in elevation.
Figure 11 is an elevation of cross-bearing for rake-head.
Figure 12, rake-head frame and guide.
Figures 13 14 represent mode of tripping rake-pinion.
Figure 15, pivot cross-bearing of rake-head.
Figure 16, section of rake-head cross-bearing.
Figure 17, elevation outer side of machine.
Figure 18, elevation of same in different position.
Figures 19, 20, 21, 22, 23, 24, 25, details of sector-plate.
Figure 26, section of latch on controlling-lever.
Figure 27, elevation representing action of controlling-lever.
Figures 28 and 29 exhibit adjustments of reel.
Figure 30, perspective of machine arranged as a mower.

This invention relates to that class of harvesters known as single-wheel machines, from the fact that only one driving-wheel is employed, and the connections between the main frame and cutting apparatus are rigid.

That others may fully understand its connection and operation, we will particularly describe it.

The main frame is in rectangular form, and is composed of the wrought-iron bars A A, securely bolted, riveted, or welded together.

The finger-bar B is rigidly attached to the front cross-bar A, and the corresponding rear cross-bar supports the beam C, upon which the platform D rests and is secured.

The joint between the beam C and the main frame bar A is rendered rigid and secure by the interposition of a flanged shoe-plate, E, which receives all the lateral strains, and thus prevents any breaking of the bolts, or splitting of said beam C.

The platform D belongs to that class known as quadrant-shaped, from which the grain is swept by a vibrating rake in the arc of a circle.

For the purpose of increasing the rigidity of the main frame, the outer and center longitudinal bars A A are made of angle-iron, as shown in fig. 1.

The circular plate F, shown in fig. 23, is provided at its back with a stout flange, which sits upon the outer bar A, and is securely bolted thereto.

The back of said plate F is also provided with a solid central hub or projection, which is bored out to form a bearing for the main frame shaft G.

The stud H is also cast with the plate F, and supports, at its upper end, the foot-board I, which partially covers the gearing, and forms a convenient rest for the driver's foot.

The central portion of the plate F is fashioned so as to form a hub or bearing for the sector-plate J, as shown in the sectional figures 6 and 19, and near the periphery of the plate F is a series of holes or cells, $f f f$, to receive the point of the stop-latch K, fig. 19, which thereby holds the two plates in the desired relative position, as hereafter more fully explained.

The sector-plate J is recessed on its back, so as to receive the face, and its central part is bored out, so as to fit accurately the central hub of the plate F, and, when in position, the two plates are secured against separation, but with freedom for the sector plate J to move upon the plate F about their common center, by means of the L-headed bolts $j$, fig. 22.

A hub, L, is cast upon the front side of the sector-plate J, and at a point near its outer edge, and to said hub the eccentric sleeve M is secured by the string-bolt N, fig. 5.

The interior and exterior surfaces of the sleeve M are slightly eccentric to each other, and by this means the distances between the axis of the sector-plate and the axis of said sleeve may be slightly varied, by partially rotating said sleeve upon the bolt N, for the purpose of adjusting the mesh of the cogs of the pinion O and the driver P, which is a part of the driving-wheel Q, and revolves upon said sleeve as an axle.

By the means above described the main frame may be adjusted in height from the ground by causing the sector-plate J to rotate upon the plate F about their common axis, and said frame may be maintained at the desired height by means of the latch-pin K, which engages in one or another of the holes $f$, as may be required for that purpose.

In order to facilitate a change of relative position, as above set forth, sockets, R, are made at various points around the periphery of the plate J, for the reception of the levers $s$, or some convenient substitute therefor.

The post I is located upon the central longitudinal bar A, and is formed with foot-flanges at its lower end, through which bolts pass to secure it firmly to said bar A. It is located laterally opposite the stud H, and its lower portion is pierced to form a box or bearing for the inner end of the pinion-shaft G.

The upper end of the post T is braced and supported by a rod, $t$, which unites it with the top of the stud H. The rod $t$ also serves as a support to the forward end of the foot-plate I.

The stud U is fixed in the upper end of the post T, and projects laterally therefrom, to receive the hub of the internal gear-wheel V, which drives the rake.

The internal gear-wheel V meshes with the driving-pinion W, which is located upon the inner end of the shaft G.

The bevel driver X is secured to the shaft G, and is located between the central and outer longitudinal bars A, and meshes with the corresponding pinion Y upon the cutter's crank-shaft $z$.

This shaft $z$ is laid in the long box $a$, which is firmly bolted to the main frame, as shown in fig. 5, and the crank-wheel $b$ is at the front end thereof.

The pinions O and W are both made to slide upon the shaft G, and are provided with collars, by means of which said pinions are moved out of or into engagement with the clutch-pins $c$ $c$, by means of which they are coupled to the shaft G, and the pinions are so moved by means of clutch-levers $d$ $d'$, conveniently located for that purpose.

The lever $d$ is pivoted to a small stud, $e$, which projects from the back of the plate F, and its forward end engages in a slot with the sliding shipper $g$, which moves in a way made for it through the plate F, as shown in fig. 6. The rear portion of the lever $d$ is retained in position by stops made in the rear plate of the foot-board I.

The lever $d'$ is pivoted to the front side of the post T, and it operates through a secondary lever, $g$, which is also pivoted to the front side of the post T, and is connected at its lower end with the shipping-collar $h$ by a link, $i$.

A spring, $k$, operates against the collar $h$, and retains the pinion W in engagement with its clutch-pin whenever the lever $d'$ is released from the force used to disengage said pinion.

By means of the lever $d$ the entire mechanism may be disengaged from the driving power, and its operation cease, although the machine may continue to move forward, and by means of the lever $d'$ the rake only is thrown out of gear, and may be caused to stop, while the cutters and reel continue to operate.

A vertical flanged shoe-piece, $l$, is cast with the long box $a$, to serve as a step to support the bottom of the post $m$, which is securely bolted thereto.

At the top of said post $m$ the beam $n$ is pivoted by a horizontal bolt, $o$, and upon the rear end of said beam the driver's seat $p$ is mounted.

When the machine is adjusted to a high or low cut, it is necessary that the driver's seat should be correspondingly adjusted, so that he may be comfortably placed, and, to this end, the beam $n$ is supported by an adjusting-rod, $q$, which joins said beam at a point just over the main axle M, and at its lower end it passes through a socket, $r$, which is attached to a sleeve, $s$, which is fitted to the axle M, outside of the hub of the wheel Q.

By means of the set-screw $u$ the rod $q$ may be secured and maintained at any point, and the seat $p$ thereby adjusted at any desired height.

The foot-board I supports one foot of the driver, and the other foot rests in the stirrup $v$, which is adjustable up and down upon the rod $q$.

The tongue $w$ is jointed to a curved arm, $y$, the rear end of which is bolted to the main frame.

The object in using the arm $y$ is to accommodate the pitman $z$, which would be incommoded by the movement of the tongue if the joint of the same should be located as far back as the main frame.

The lateral brace M', which is secured to the tongue by bolts, and to the main frame by a pivot-bolt, the axis of which is coincident with the axis of the tongue-joint, gives sufficient power to the tongue to resist lateral strains, and does not impede its up-and-down movements.

The lever A' is bolted to the tongue $w$ at a point a little in advance of the joint of the same, and it may be strengthened by the brace B'.

The lever A' extends backward to a point within convenient reach of the driver's hand, so that, while the machine is in motion, he may, by moving said lever, depress or elevate the forward end of the main frame.

The curved standard $c'$ slides through a loop, D', at the side of the lever A', and the latch E' engages with one of a series of notches in the edge of said standard, and retains the lever A' at any desired point of elevation.

The reel-post F is pivoted at its lower end to the main frame, and is capable of motion on said pivot in a direction longitudinal to the machine, and the brace G' holds it securely in any position in which it may be desirable to place it, shift-holes in the forward end of said brace being provided for that purpose.

The reel H' is overhung, and has its bearings in the long box I', which may be shifted up and down upon the post by means of bolts, and a series of holes through the post, to accommodate the machine to different heights of grain.

A belt, J', passes over the pulley K' on the main pinion-shaft, and the pulley L' on the reel-shaft, and thus transmits motion to the reel. Lateral motion of the reel-post F' is stayed by means of the lateral brace L''.

The horizontal vibrations of the rake N' are accomplished about the post O' as a center, and its vertical movements are made about the axes P' Q', fig. 16, which are oblique to each other, as shown.

The box R' contains the bearings of the axes P' Q', and is supported upon the stem or shaft S', which descends through the hollow post O', having a free horizontal revolution therein, and is secured from lifting by a pin or other device.

The axis Q' connects the box R' with the vibrating guide-frame T', the screw-pin U' serving for that purpose, and said frame is provided at one end with a spherical pin or wrist, V', which, when the parts are in position, is stepped in a socket, W', which is secured to the outer face of the internal gear-wheel V.

The point of intersection of the axial lines P' and Q' must be adjusted to coincide or be cut by the axial line of the pin U, about which the wheel V revolves, and it will then appear evident that, as said wheel revolves, the wrist V' will move in a circular path, and the frame T' will have imparted to it a compound movement, consisting of a horizontal vibration on the axis S' and a vertical vibration on the axis Q'.

The front or outer end of the frame T' is formed with an L-shaped slot or opening, Y', through which the rake-arm X enters to its bearing in the box R', axis P', as shown in fig. 3. The line of the rake-head N' and its axial line P' are only slightly oblique to each other, but the rake-head is far in advance of its axis of revolution, and it is therefore necessary that the arm X' should be bent as shown in the figure; that is to say, so bent that, as the rake lifts, it may continue nearly or exactly parallel with the platform. The rake descends upon the platform as the wrist U' is ascending, and the rake-arm X' therefore enters the vertical portion of the slot Y'. The rake is moved backward by the movement of the box R', and is steadied and supported in that movement by the frame T' in front of the slot. When the rake has reached the rear edge of the slot Y', the motion of the frame T' has brought the arm X' to the angle of the slot, and the further motion of the frame T' causes the arm X' to be lifted up and traverse back and forth along the horizontal portion of said slot until the revolution of the wheel V is completed, and the rake descends again upon the platform.

The greatest amount of friction is found to occur at the angle of the horizontal and vertical portions of the slot Y', and a plate of steel is therefore inserted at that point.

The constant friction of the teeth of the rake over the surface of the platform, soon wears grooves therein, and these offer impediments to the successful operation of the rake. We have therefore placed about midway of the rake-head, a tooth, $a'$, of extraordinary strength, and have placed a strip of metal, $b'$, upon the surface of the platform, exactly covering the path or track of the tooth $a'$, and slightly elevated above the surface of the platform, so that, as the rake moves backward, its weight will be sustained by the tooth $a'$, and the remaining rake-teeth will not rest upon the platform nor abrade its surface.

It is frequently necessary to disconnect the rake so that it shall not remove a gavel at every revolution of its driving-wheel, and, as before described, this is done by means of the clutch-lever $d'$, and, in order to prevent any backward motion of the rake, which is sometimes injurious to the mechanism, the cogs $r\ r$ are made upon that portion of the periphery of the wheel V, which will be toward the rear during that portion of the revolution when the rake will be rising from the platform, and the pawl S' is jointed to the rear bar of the main frame, in such a position as will insure its engagement with one of the cogs $r'$, and arrest a backward movement of the rake if such should occur.

The grain-wheel $c'$ is mounted upon an axle, $d''$, which projects from the plate $e'$, and said plate is fitted to slide between grooved flanges at the edges of a plate, $f'$, which latter plate is firmly secured by screws or otherwise to the divider $g'$. By this means the grain-wheel $c'$ may be raised or lowered in reference to the divider, and thereby the outer end of the cutting apparatus may be adjusted to correspond in height with the inner end of the same.

A series of holes, $h'\ h'$, is made along the central line of the plate $f'$, and a spring-latch, $i'$, similar to the latch K, is placed upon the plate $e'$, so that said latch may engage in one of said holes, and retain the plate $e'$ at the proper point. A stop, $k'$, at the upper end of the plate $f'$, will prevent the descent of the cutting apparatus below a certain point, in case of the accidental fracture or displacement of the latch $i$.

In order to facilitate the adjustment of the outer end of the cutting apparatus at the proper height, the lever $m'$ is provided with a stud or hook, $n'$, on one of its sides, and said stud or hook will catch in one of the holes $p'$, arranged along one edge of the plate $f$, and thereby serve as a fulcrum for said lever, the short arm of which will rest upon the stud of the latch $i'$, as shown in fig. 10.

To convert this machine into a mowing-machine, it is only necessary to remove the platform and rake.

Having described our invention,

What we claim as new is—

1. In combination with a circular sweeping rake and the internal gear-wheel V, the oscillating and vibrating frame T', connected with the rake-arm X and axis S' by the box R', substantially as shown and described.

2. In combination with the wheel V, which drives the harvester-rake, the ratchet $r'$, in connection with the stop-pawl S', fixed upon the frame for the purpose of preventing a backward movement of the rake, as described.

3. The plate J, which supports the master-wheel Q, in combination with the plate F and spring-latch for retaining said plate at any point desired, when these parts are constructed and united in the manner described.

4. The adjustable socket $r$ and sleeve $s$, in combination with the adjusting rod $q$ and beam $n$, and adjustable stirrup $v$, for the purpose set forth.

5. The master-wheel pinion-shifter $g$, arranged to work through the hub of the circular plate F, substantially as shown and described.

SALEM T. LAMB.
WM. N. WHITELEY.

Witnesses:
THOS. J. PRINGLE,
CHAS. EVANS.